(12) United States Patent
Fujishiro et al.

(10) Patent No.: US 8,430,453 B2
(45) Date of Patent: Apr. 30, 2013

(54) SEAT RECLINING DEVICE FOR VEHICLE

(75) Inventors: Shun Fujishiro, Anjo (JP); Yukifumi Yamada, Toyota (JP); Kazuhide Ishikawa, Anjo (JP); Yoshihiro Hirate, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/390,447

(22) PCT Filed: Aug. 3, 2010

(86) PCT No.: PCT/JP2010/063059
§ 371 (c)(1),
(2), (4) Date: Feb. 14, 2012

(87) PCT Pub. No.: WO2011/021496
PCT Pub. Date: Feb. 24, 2011

(65) Prior Publication Data
US 2012/0139319 A1 Jun. 7, 2012

(30) Foreign Application Priority Data
Aug. 21, 2009 (JP) .................. 2009-192169

(51) Int. Cl.
*B60N 2/235* (2006.01)
(52) U.S. Cl.
USPC ............... 297/267; 297/267 P; 297/267 R
(58) Field of Classification Search .............. 297/367 R, 297/367 L, 367 P
See application file for complete search history.

(56) References Cited

U.S. PATENT DOCUMENTS

| 6,325,458 B1 | 12/2001 | Rohee et al. |
| 6,439,663 B1 * | 8/2002 | Ikegaya .................... 297/367 R |
| 6,474,740 B1 * | 11/2002 | Kondo et al. ............. 297/367 R |

(Continued)

FOREIGN PATENT DOCUMENTS

| CN | 1366854 A | 9/2002 |
| CN | 1522891 A | 8/2004 |

(Continued)

OTHER PUBLICATIONS

International Search Report Issued Oct. 12, 2010 in PCT/JP10/63059 Filed Aug. 3, 2010.

(Continued)

*Primary Examiner* — David Dunn
*Assistant Examiner* — David E Allred
(74) *Attorney, Agent, or Firm* — Oblon, Spivak, McClelland, Maier & Neustadt, L.L.P.

(57) ABSTRACT

A holder in a seat reclining device for vehicle has a body portion which comprises a cover wall slidably covering an end surface at an outer circumferential portion of an upper arm on an opposite side to a lower arm and a circumferential wall formed continuously with the cover wall and covering an outer circumferential surface of the lower arm, and fixed portions provided at an end of the circumferential wall and fixed by pressing on an end surface at an outer circumferential portion of the lower arm on an opposite side to the upper arm. The holder is formed with a plurality of load receiving portions cut and bent from the body portion to contact an end surface at the outer circumferential portion of the lower arm on the upper arm side for supporting a pressing load at the time of a fixing by pressing.

4 Claims, 7 Drawing Sheets

U.S. PATENT DOCUMENTS

| | | | |
|---|---|---|---|
| 6,910,737 B2* | 6/2005 | Hosokawa | 297/362 |
| 8,262,165 B2* | 9/2012 | Mitsuhashi | 297/362 |
| 8,267,476 B2* | 9/2012 | Kumazaki et al. | 297/367 P |
| 2002/0041119 A1* | 4/2002 | Kojima et al. | 297/367 |
| 2003/0155800 A1* | 8/2003 | Asano | 297/367 |
| 2003/0178879 A1* | 9/2003 | Uramichi | 297/367 |
| 2004/0036337 A1* | 2/2004 | Hoshihara et al. | 297/367 |
| 2007/0040436 A1* | 2/2007 | Oki | 297/367 |
| 2007/0132294 A1* | 6/2007 | Yamada et al. | 297/367 |
| 2008/0211285 A1 | 9/2008 | Ishihara et al. | |
| 2012/0217782 A1* | 8/2012 | Yamada et al. | 297/367 R |

FOREIGN PATENT DOCUMENTS

| | | |
|---|---|---|
| CN | 2716063 Y | 8/2005 |
| CN | 1923565 A | 3/2007 |
| CN | 101227845 A | 7/2008 |
| EP | 0 623 485 A1 | 11/1994 |
| FR | 2 848 156 A1 | 6/2004 |
| JP | 2000 333758 | 12/2000 |
| JP | 2001-157615 | 6/2001 |
| JP | 2007-14431 | 1/2007 |
| JP | 2009 165778 | 7/2009 |
| WO | 2009 037973 | 3/2009 |

OTHER PUBLICATIONS

Extended Search Report issued May 7, 2012 in European Patent Application No. 10809841.9-2424.

Official Communication issued May 24, 2012 in European Patent Application No. 10809841.9-2424.

Chinese Office Action for Chinese Application No. 201080035047.1 mailed Dec. 17, 2012 with English translation, 12 pages.

* cited by examiner

US 8,430,453 B2

SEAT RECLINING DEVICE FOR VEHICLE

TECHNOLOGICAL FIELD

The present invention relates to a seat reclining device for vehicle supporting a seatback to be angularly adjustable relative to a seat cushion.

BACKGROUND ART

Heretofore, as seat reclining devices of this kind, there has been known one which is described in Patent Document 1 (JP2000-333758 A), for example. The device described in Patent Document 1 has a base member 11 fixed to a seat cushion side of a vehicle seat, a rotating arm 12 rotatably supported on the base member 11 and fixed to a seatback, a locking mechanism for locking the rotating arm 12 not to rotate, an operating lever 15 for bringing the locking mechanism into an unlocking state, and a return spring urging the seatback in a forward tilting direction. The base member is provided at an outer circumferential part thereof with a ring member 33 engaging an outer circumferential part of the rotating arm 12. (refer to symbols described in Patent Document 1).

SUMMARY OF THE INVENTION

Problem to be Solved by the Invention

In the device described in Patent Document 1, for a stable pressing work, a flat portion as a seat surface constituting a seat for a pressing jig should be properly secured at a place corresponding to a pressed portion 43 of the ring member 33. Thus, unless an annular portion of the base member 11 (the outer circumferential portion with which the pressed portion 43 of the ring member 33 is brought into contact) has a width which is a predetermined value or more in the radius direction, the base member 11 cannot be held stably during the pressing work. However, since the ring member 33 has a structure that it is bent at a plurality of steps to be brought into contact with the annular portion of the base member 11, a bending curve is produced at the bent portions. Thus, in order to secure the flat portion for the realization of stable holding, the outer diameter of the base member 11 has to be enlarged as a matter of course, and the annular portion being high in dimensional accuracy has to be provided over the whole circumference of the base member 11. This gives rise to a problem that the manufacturing cost and the weight increase.

The object of the present invention provides a seat reclining device which enables a pressing work to be done stably without involving increases in weight and cost.

Measures for Solving the Problem

In order to solve the aforementioned problem, the invention in a seat reclining device for vehicle essentially comprises:

a lower arm adapted to be supported on either one of a seat cushion side and a seatback side;
 an upper arm supported by the lower arm to be relatively rotatable and adapted to be supported on the other of the seat cushion side and the seatback side;
 a plurality of pawls supported in the lower arm to be radially movable along guide walls and having outer gears disengageably engaged with an inner gear provided on an internal surface of the upper arm;
 a cam for radially moving the pawls by being rotated;
 an urging member engaged with the lower arm at one end and engaged with the cam at the other end and urging the cam in one direction; and
 a holder having a body portion which comprises a cover wall slidably covering an end surface at an outer circumferential portion of the upper arm on an opposite side to the lower arm and a circumferential wall formed continuously with the cover wall and covering an outer circumferential surface of the lower arm; fixed portions provided at an end of the circumferential wall and fixed by caulking on an end surface at an outer circumferential portion of the lower arm on an opposite side to the upper arm; and a plurality of load receiving portions cut and bent from the body portion to contact an end surface at the outer circumferential portion of the lower arm on the upper arm side for supporting a caulking load at the time of a fixing by caulking; the holder being fixed on the outer circumferential portion of the lower arm for permitting relative rotational movement between the lower arm and the upper arm and for preventing one of the lower arm and the upper arm from coming off the other in an axial direction.

BRIEF DESCRIPTION OF THE DRAWINGS

FIGS. 6A and 6B are detail views showing a first pawl, wherein FIG. 6(A) is a front view of the first pawl and FIG. 6(B) is a side view of the first pawl as viewed in the B direction.

FIGS. 7A and 7B are detail views showing a second pawl, wherein FIG. 7(A) is a front view of the second pawl and FIG. 7(B) is a side view of the second pawl as viewed in the B direction.

FORM FOR PRACTICING THE INVENTION

Hereafter, an embodiment of the present invention will be described with reference to the drawings.

Figure 1:
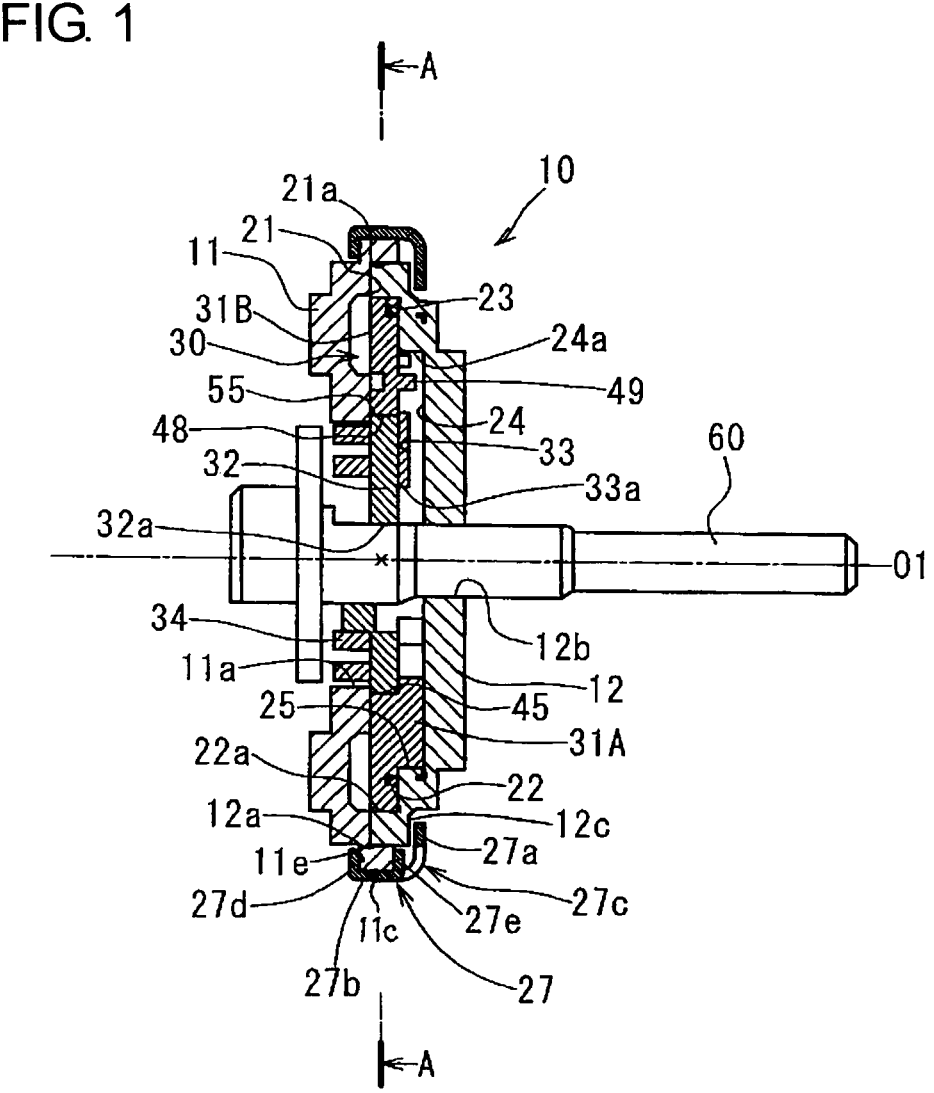
FIG. 1 is a sectional view, taken along a surface including the rotational axis of a hinge shaft 60, of a seat reclining device showing an embodiment of the present invention.
Figure 2:
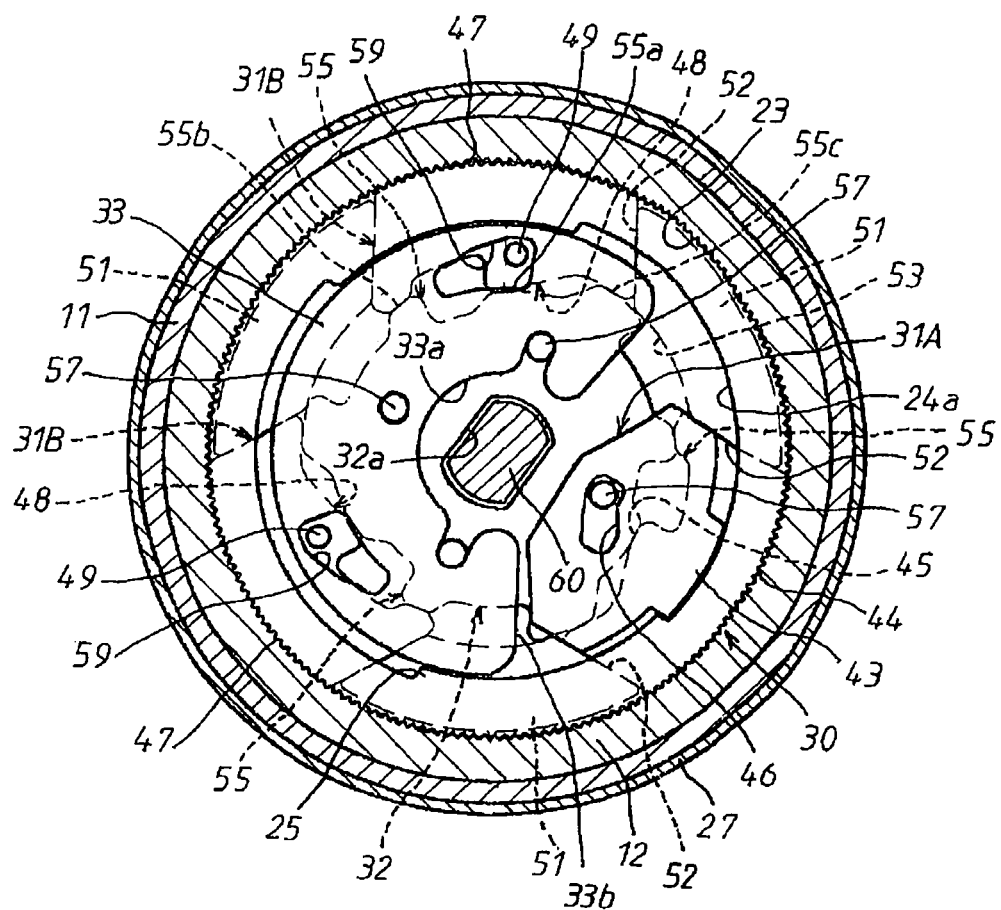
FIG. 2 is a sectional view taken along the line A-A in FIG. 1.
Figure 3:
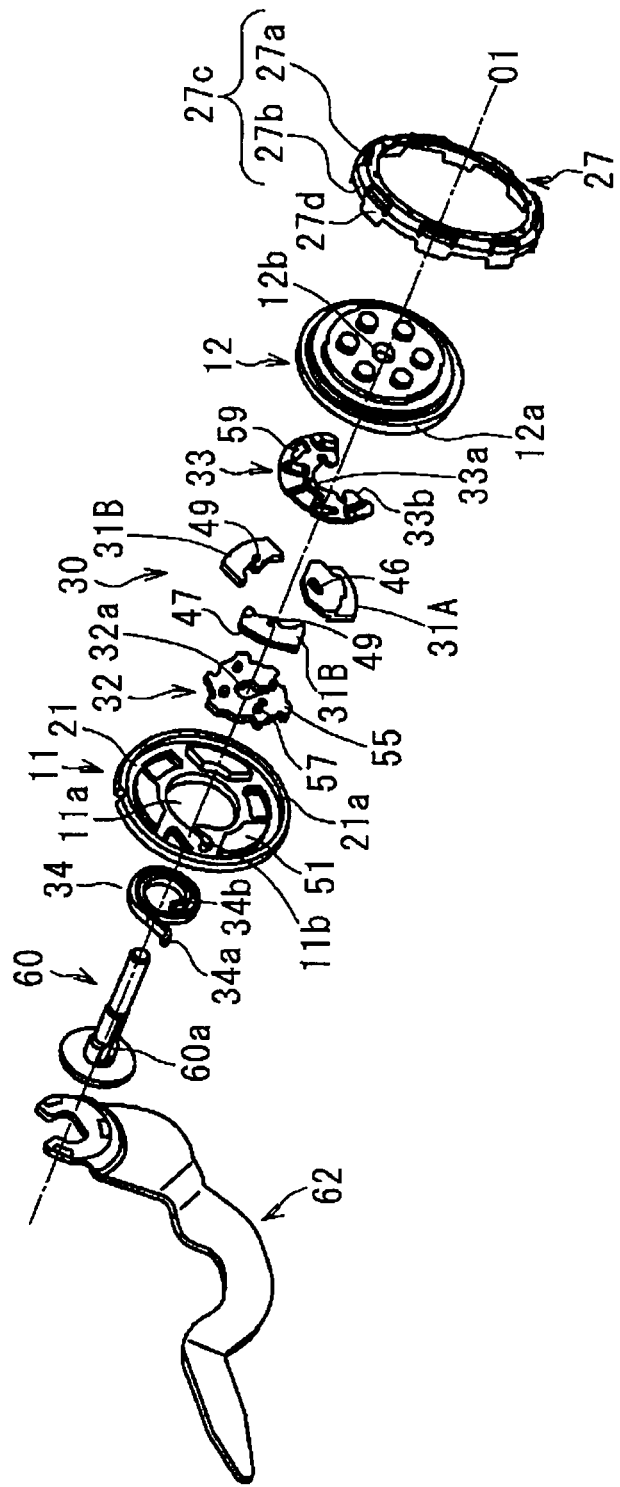
FIG. 3 is an exploded view of the seat reclining device in FIG. 1.

As shown in FIGS. 1-3, a seat reclining device 10 is provided with a lower arm 11 and an upper arm 12 which are disc-like. The lower arm 11 is secured to a seat cushion for vehicle, while the upper arm 12 is secured to a seatback.

The lower arm 11 is provided with a round recessed portion 21 formed by half blanking to open toward the upper arm 12 and has a through hole 11a at its center portion. The round recessed portion 21 of the lower arm 11 has an internal surface 21a placing its center on a rotation axis O1 of the upper arm 12 and the lower arm 11. The upper arm 12 is fitted so that its outer surface 12a is in slidable contact with the internal surface 21a of the lower arm 11.

On the other hand, the upper arm 12 is provided with a round recessed portion 22 formed by half blanking to open toward the lower arm 11 and has a through hole 12b at its center portion. The round recessed portion 22 of the upper arm 12 has an internal surface 22a placing its center on the rotation axis O1. The internal surface 22a of the round recessed portion 22 is formed with an inner gear 23 over the whole circumference. On the inner side of the recessed portion 22, a round recessed portion 24 is formed by half blanking on a circle concentric with the round recessed portion 22. On an internal surface 24a of the round recessed portion 24, protrusions 25 are formed at two places in the circumferential direction to extend toward the rotation axis O1, as shown in FIG. 2.

Figure 5:
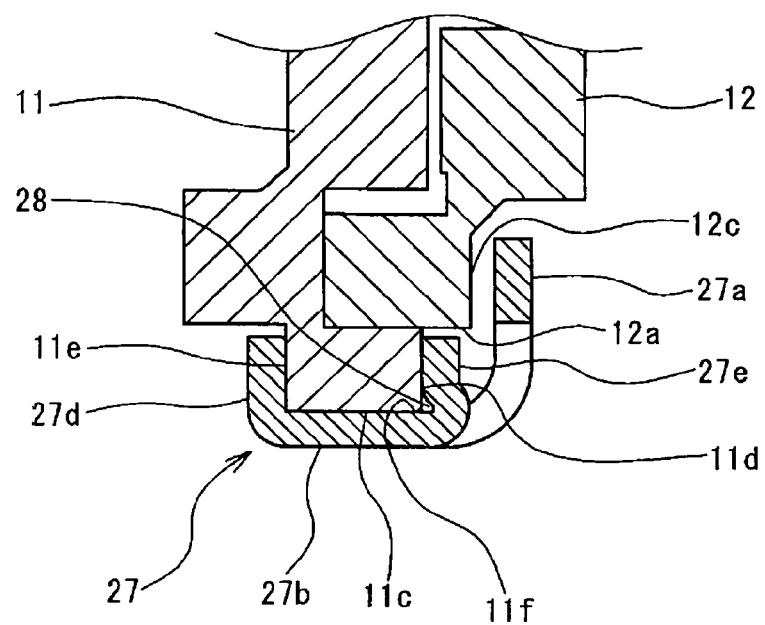
FIG. 5 is a sectional view showing the holder fixed by caulking on the lower arm.

As shown in FIGS. 1 and 5, the outer surface 12a of the upper arm 12 is relatively rotatably fitted in the internal surface 21a of the lower arm 11, and a part of the outer surface 12a of the upper arm 12 is protruded from an end surface of the lower arm 11. A holder 27 made of a metal plate is secured on the outer circumference of the lower arm 11.

Figure 4:
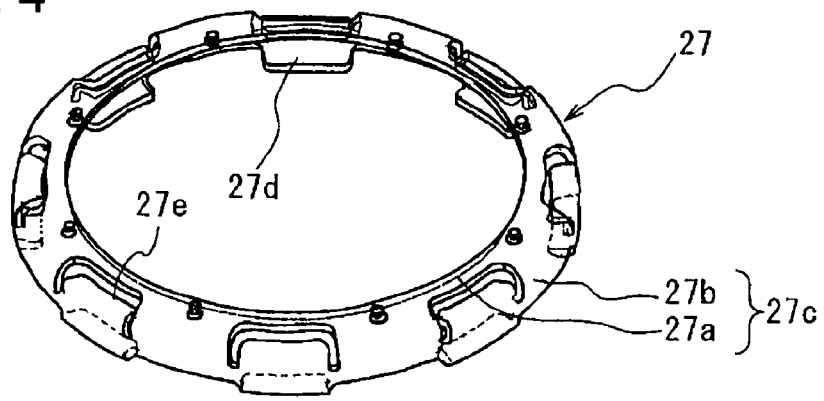
FIG. 4 is a perspective view showing a holder.

As shown in FIGS. 1, 4 and 5, the holder 27 has a body portion 27c comprising a cover wall 27a which slidably covers an end surface 12c at the outer circumferential portion of the upper arm 12 on an opposite side to the lower arm 11, and a circumferential wall 27b formed continuously with the cover wall 27a and covering an outer circumferential surface 11c of the lower arm 11 and also has fixed portions 27d provided at an end of the circumferential wall 27b and fixed by pressing on an end surface 11e at the outer circumference of the lower arm 11 on an opposite side to the upper arm 12. The cover wall 27a is bent at an approximately right angle toward the end surface 12c of the upper arm 12 and is in contact with the end surface 12c of the upper arm 12. Thus, the lower arm 11 and the upper arm 12 are prevented from coming off each other in the axial direction in a state that they are allowed to rotate relative to each other. The end surface 12c and the cover wall 27a slide on each other with a slight clearance therebetween, and in FIGS. 1 and 5, the clearance is illustrated to be large in an exaggerated scale. Also in FIG. 4, the lower arm 11 is not shown, and the holder 27 is illustrated with itself fixed by pressing on the lower arm 11.

There are formed a plurality of load receiving portions 27e which are cut and bent from the body portion 27c to contact an end surface 11d at the outer circumferential portion of the lower arm 11 on the upper arm 12 side for supporting a pressing load at the time of a fixing by pressing. The load receiving portions 27e formed by cutting and bending parts of the body portion 27c are arranged at plural places at regular intervals in the circumferential direction. Thus, a curve caused by bending is not generated at an end portion of each load receiving portion 27e, so that a large flat portion can be obtained. Therefore, it is unnecessary to newly provide portions supporting the pressing load by enlarging the outer diameters of the lower arm 11 and the holder 27, so that the device can be downsized. Further, although the portions supporting the pressing load should be precise in the height direction (in the rotational axis direction), the load receiving portions are not required to be provided over the whole outer circumferential portion of the holder, thereby realizing a reduction in cost. The load receiving portions 27e may not formed to be necessarily at regular intervals in the circumferential direction.

The fixed portions 27d are provided at the positions corresponding to the load receiving portions 27e in the circumferential direction of the upper arm 12 and the lower arm 11. Thus, when the fixed portions 27d are fixed by pressing, the holder 27 is held reliably and stably, so that the fixing by pressing can be done reliably.

Further, since the fixed portions 27d are pressed on the lower arm 11 with the load receiving portions 27e receiving the pressing load, it does not occur that the pressing load is exerted on the cover wall 27a during the pressing work. Therefore, the cover wall 27a is neither deformed as a result of being pressed strongly on the end surface 12c of the upper arm 12 nor separated from the end surface 12c of the upper arm 12 too far, so that a smooth sliding can be secured between the end surface 12c of the upper arm 12 and the cover wall 27a.

An annular space 28 of a predetermined capacity is formed between each corner portion connecting the circumferential wall 27b with each load receiving portion 27e and the end surface 11d at the outer circumferential portion of the lower arm 11 on the upper arm 12 side. Thus, even if burrs are produced at a corner portion 11f which is defined by the end surface 11d at the outer circumferential portion of the lower arm 11 on the upper arm 12 side and the outer circumferential surface 11c of the lower arm 11, the burrs are received in the annular spaces 28. Thus, it does not occur that the fixing by pressing is done with the load receiving portions 27e rising or that the burrs bite the load receiving portions 27e, and hence, the dimensional accuracy of the load receiving portions 27e can be secured to be high in the height direction (in the rotational axis direction).

A locking mechanism 30 is arranged between the lower arm 11 and the upper arm 12. As shown in FIGS. 2 and 3, the locking mechanism 30 is composed mainly of three pawls 31 (31A and 31B referred to later) on a circle, a cam 32, a release plate 33 and a spiral spring 34 as urging member (refer to FIG. 3). The pawls 31 comprise three pawls of two kinds which are arranged at equiangular intervals on a surface orthogonal to the rotation axis O1.

Figure 6A:
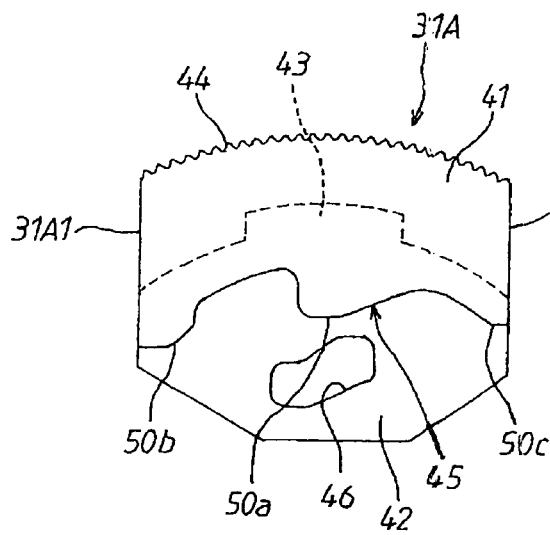
Figure 6B:
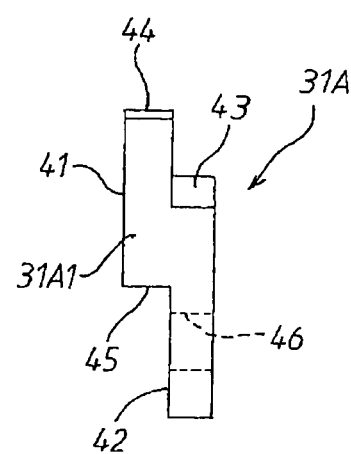

One pawl 31 (hereafter referred to as first pawl 31A) is manufactured by, for example, forging a steel, and as shown in FIGS. 6(A) and 6(B) in detail, is provided with a first block 41 and a second block 42 which are formed to be offset from each other as viewed in a side view. The first pawl 31A is arranged to locate the first block 41 on the internal surface 22a side of the upper arm 12 and the second block 42 on the axis side of the upper arm 12. The opposite width-end portions 31A1 of these first block 41 and second block 42 are formed to be in alignment and to represent parallel straight lines. The outward end (the end surface facing the inner gear 23 of the upper arm 12) of the first block 41 is formed with an outer gear 44 being able to mesh with the inner gear 23 of the upper arm 12, while the inward end (the end surface opposite to the outward end) of the first block 41 is formed with an inner cam portion 45 engageable with an outer surface of the cam 32. Further, in the second block 42, a pawl grooved cam portion 46 is provided to pass through in the thickness direction at about the center portion in the width direction. And, an engaging portion 43 engageable with the protrusion portion 25 of the upper arm 12 is formed on the back side of the second block 42.

Figure 7A:
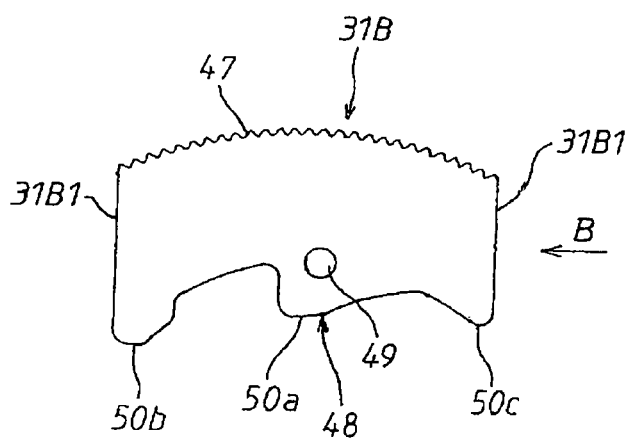
Figure 7B:
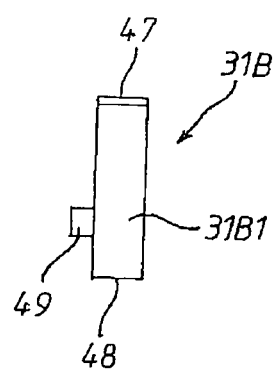

On the other hand, of the three, two remaining pawls 31 (hereafter referred to as second pawls 31B) are manufactured by, for example, pressing a plate-like steel sheet, and as shown in FIGS. 7(A) and 7(B) in detail, each takes a flat shape which closely resembles the shape configured only by the first block 41 of the first pawl 31A by cutting out the second block 42 therefrom, and hence, which does not have any step. That is, the second pawl 31B is formed to be radially shorter by the length of the second block 42 than the first pawl 31A and to be thinner by the thickness of the second block 42. Like the first pawl 31A, the second pawl 31B has the opposite width-end portions 31B1 formed to represent parallel straight lines. The outward end of each second pawl 31B is formed with an outer gear 47 being able to mesh with the inner gear 23 of the upper arm 12. The inward end of each second pawl 31B is formed with an inner cam portion 48 engaged with the outer surface of the cam 32. Further, an engaging protrusion 49 is provided on an end surface of each second pawl 31B to protrude from a center portion in the width direction.

The inner cam portion 45 formed at a stepped portion of the aforementioned first pawl 31A and the inner cam portion 48 formed at the inward end of the second pawl 31B are formed to take the same shape. Specifically, as shown in FIGS. 6(A) and 7(A), each of the inner cam portions 45, 48 is provided with three pressed portions 50a, 50b, 50c on which cam surfaces 55 of the cam 32 act, at a center portion and opposite sides in the circumferential direction of each of the first and second pawls 31A, 31B. The pressed portion 50a and the pressed portion 50b, which are provided at the center portion and on a side ahead in a locking rotation direction of the cam 32, of each of the first and second pawls 31A, 31B are constituted by cam shapes each having an inclined surface which comes close to the cam surfaces 55 of the cam 32 with rotation of the cam 32 in the locking rotation direction (counterclockwise in FIG. 2), whereas the pressed portion 50c which is provided on a side behind in the locking rotation direction of the cam 32 is constituted by an arc surface having its center on the rotation center of the cam 32.

In the round recessed portion 21 of the lower arm 11, three guide walls 51 are arranged at equiangular intervals, and guide surfaces 52 which slidably guide the opposite width-end portions 31A1, 31B1 (refer to FIGS. 6 and 7) of each of the first and second pawls 31A, 31B between two adjoining guide walls 51 are formed in parallel to face each other. Thus, the first and second pawls 31A, 31B are slidably moved in the radial direction of the lower arm 11 and the upper arm 12 by being guided along the guide surfaces 52 of the guide walls 51 and enable the respective outer gears 44, 47 to be disengageably engaged with the inner gear 23. The guide walls 51 are formed at internal surfaces thereof with arc surfaces 53 having a center on the rotation axis O1.

The cam 32 of the locking mechanism 30 is arranged in the round recessed portion 22 of the upper arm 12 to be rotatable about the rotation axis O1 and has a through hole 32a at its center portion. Further, the cam 32 has three cam surfaces 55 on its outer circumference at equiangular intervals. Of these, one cam surface 55 is arranged to be engageable with the respective pressed portions 50a, 50b, 50c of the inner cam portion 45 of the first pawl 31A, while the two remaining cam surfaces 55 are arranged to be engageable with the respective pressed portions 50a, 50b, 50c of the respective inner cam portions 48 of the second pawls 31B.

Each cam surface 55 comprises two pressing cam segments 55a, 55b contactable with the pressed portions 50a, 50b of each of the first and second pawls 31A, 31B and one centering segment 55c contactable with the pressed portion 50c. When the cam 32 is rotated in the locking rotation direction, the two pressing cam segments 55a, 55b and said one centering segment 55c are held at such angular positions that they are respectively brought into contact with the respective pressed portions 50a, 50b, 50c of each of the inner cam portions 45, 48 of the first and second pawls 31A, 31B. Further, when the cam 32 is rotated in a direction to release the locking, the pressing cam segments 55a, 55b and the centering segment 55c are moved away from the respective pressed portions 50a, 50b, 50c, and the centering segment 55c is held at such an angular position as to be engaged with the arc surface 53 of the guide wall 51.

A side surface of the cam 32 protrudes a plurality of engaging protrusions 57 at equiangular intervals, and one of these engaging protrusions 57 is engaged with the pawl grooved cam portion 46 formed in the first pawl 31A. The pawl grooved cam portion 46 and the engaging protrusion 57 cooperate to move the first pawl 31A radially inward with rotation of the cam 32 in the locking release rotation direction. The engaging protrusions 57 are not necessarily required to be protruded on the same circle at equiangular intervals, but may be protruded on different circles or with arbitrary intervals secured therebetween.

The release plate 33 made of a thin plate is bodily attached to a side surface of the cam 32, with itself engaged with the engaging protrusions 57, and the release plate 33 has a through hole 33a at its center portion. The release plate 33 is attached to the cam 32 in alignment with the second block 42 of the first pawl 31A at a position in the axial direction and slidably faces end surfaces of the second pawls 31B. The release plate 33 comprises an approximately ring shape plate held out of contact with the protrusions 25 formed on the upper arm 12, wherein a sector cutout 33b is formed at a part of the ring shape plate, and the first pawl 31A is arranged at the place of the cutout 33b. That is, by cutting off a sector from the ring-like plate by an angular range corresponding to the first pawl 31A, it is prevented that rotation of the cam 32 brings the release plate 33 into interference with the first pawl 31A.

The release plate 33 is formed on a circle about its rotation center with two release plate grooved cam portions 59 which pass through in the thickness direction. These release plate grooved cam portions 59 are arranged radial outward of the circular position on which the engaging protrusions 57 are arranged, to correspond respectively to the end surfaces of the second pawls 31B. The engaging protrusions 49 protruding from the second pawls 31B are respectively engaged with the release plate grooved cam portions 59. Engagements of the release plate grooved cam portions 59 with the engaging protrusions 49 enable the second pawls 31B to be moved radial inward when the release plate 33, together with the cam 32, is rotated in the locking release direction (clockwise in FIG. 2).

As shown in FIG. 3, a hinge shaft 60 is arranged on the rotation axis O1 and rotatably passes through respective through holes 11a, 32a, 33a, 12b which are formed on the rotation center portions of the lower arm 11, the cam 32, the release plate 33 and the upper arm 12. A fitting portion 60a with two flat surfaces formed thereon is formed at about a center portion in the axial direction of the hinge shaft 60. The through hole 32a of the cam 32 with the hinge shaft 60 passing therethrough is formed with two flat surfaces to fit on the fitting portion 60a of the hinge shaft 60, so that hinge shaft 60 and the cam 32 are configured to rotate bodily. Here, as shown in FIG. 2, the through hole 32a of the cam 32 is formed to be slightly larger than the fitting portion 60a of the hinge shaft 60, so that a play in the radial direction is provided between both members. Thus, the cam 32 is slightly movable radially of the hinge shaft 60 within the round recessed portion 22 of the upper arm 12. Further, on one end of the hinge shaft 60, an operating handle 62 is bodily attached to the hinge shaft 60.

The spiral spring 34 is for urging the cam 32 to rotate in such a direction that the first and second pawls 31A, 31B are brought into engagements with the upper arm 12, and is received in the through hole 11a of the lower arm 11. As shown in FIG. 3, the spiral spring 34 is formed by, for example, curving a flat wire rod of an approximately rectangular shape into a predetermined spiral shape and is arranged between the lower arm 11 and the cam 32. That is, an outer end portion 34a of the spiral spring 34 is fixedly engaged with a fixing perforation 11b formed in the lower arm 11, whereas an inner end portion 34b is fixedly engaged with a fixing portion (not shown) provided on an end surface of the cam 32.

By the urging force of the spiral spring 34, the cam 32 is urged to be rotated relative to the lower arm 11 in the locking rotation direction (counterclockwise in FIG. 2), causes its cam surfaces 55 to press the first and second pawls 31A, 31B radially outward, and brings the outer gears 44, 47 of the first and second pawls 31A, 31B into engagements with the inner gear 23 of the upper arm 12.

Next, description will be made regarding the operation of the seat reclining device 10 constructed as described above.

FIG. 2 shows the seat reclining device 10 in the locking state. In this state, the pressing cam segments 55a, 55b and the centering segments 55c of the cam 32 are respectively in contact with the respective pressed portions 50a, 50b, 50c of the inner cam portions 45, 48 of the first and second pawls 31A 31B, so that the first and second pawls 31A, 31B are being pressed radially outward. Thus, the first and second pawls 31A, 31B can be pressed at the plurality of pressed portions 50a, 50b, 50c against the inner gear 23 of the upper arm 12 in a stable posture, and hence, can reliably bring the outer gears 44, 47 of the respective pawls 31 into meshing with the inner gear 23 of the upper arm 12. In this manner, the outer gears 44, 47 of the first and second pawls 31A, 31B are made to mesh with the inner gear 23 of the upper arm 12, whereby the upper arm 12 is prevented from rotationally moving relative to the lower arm 11. At this time, because of being radially movable relative to the hinge shaft 60 within the round recessed portion 21, the cam 32 can press the three pawls 31 (31A, 31B) with approximately equal pressing forces. Accordingly, it becomes possible to lock the upper arm 12 and hence, the seatback reliably without looseness.

Figure 8:
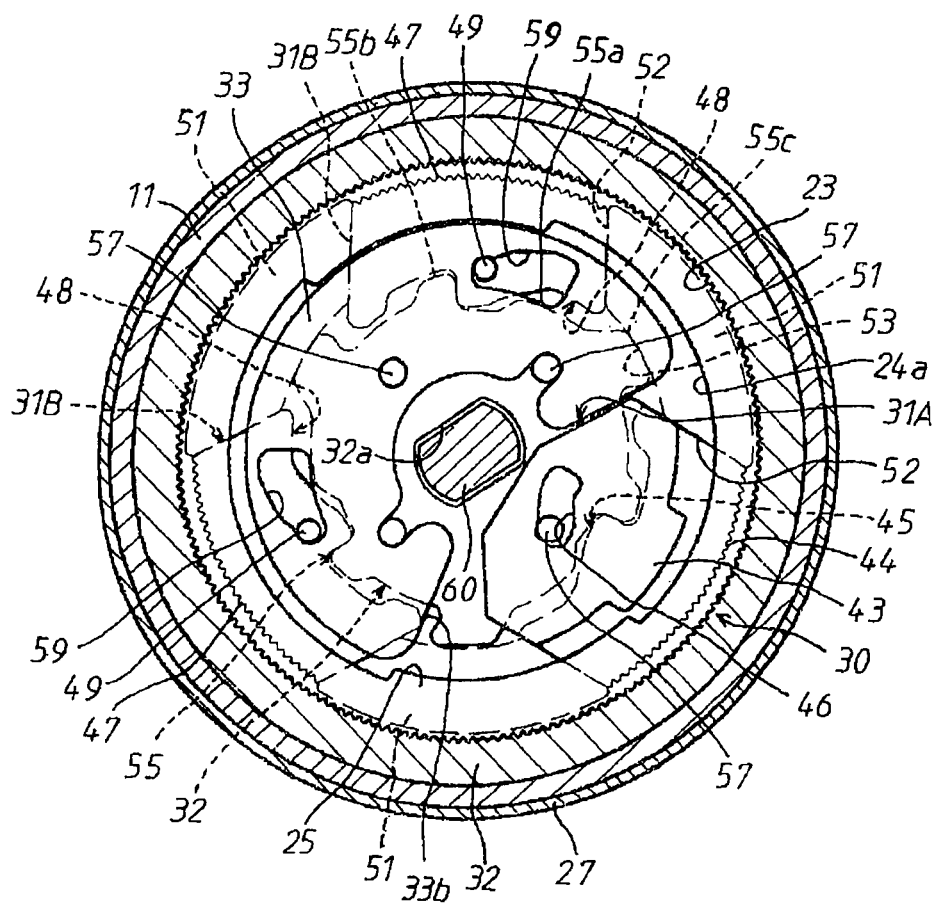
FIG. 8 is an operational state view of FIG. 2 showing the seat reclining device in an unlocked state.

In this state, when the hinge shaft 60 is rotated clockwise in FIG. 2 by manipulating the operating handle 62, the cam 32 and the release plate 33 are bodily rotated against the urging force of the spiral spring 34. As a result, the pressing cam segments 55a, 55b of the cam surfaces 55 are disengaged from the inner cam portions 45, 48 of the first and second pawls 31A, 31B, the centering segments 55c are also displaced in a direction not to interfere with the inner cam portions 45, 48, and the engagement action between the pawl grooved cam portion 46 of the first pawl 31A and the engaging protrusion 57 of the cam 32 causes the first pawl 31A to be withdrawn toward the rotation axis O1 side along the guide surfaces 52 of the guide walls 51, whereby as shown in FIG. 8, meshing is released between the outer gear 44 of the first pawl 31A and the inner gear 23. At the same time, the engagement actions between the engaging protrusions 49 of the second pawls 31B and the release plate grooved cam portions 59 cause the second pawls 31B to be withdrawn toward the rotation axis O1 side along the guide surfaces 52 of the guide walls 51, whereby meshing is released between the outer gears 47 of the second pawls 31B and the inner gear 23.

Thus, it becomes possible to rotationally move the seatback to a desired angular position relative to the seat cushion. At this time, the centering segments 55c of the cam 32 which are in a set of three are held respectively engaged with the internal surfaces 53 of the guide walls 51, so that the cam 32 is centered by the internal surfaces 53 of the guide walls 51. As a result, the clearances between the outer gears 44, 47 of the first and second pawls 31A, 31B and the inner gear 23 become approximately equal, so that the malfunction in rotational movement or the generation of a strange sound can be prevented from being caused by an interference of addendums on one of the pawls 31 with addendums of the inner gear 23.

Figure 9:
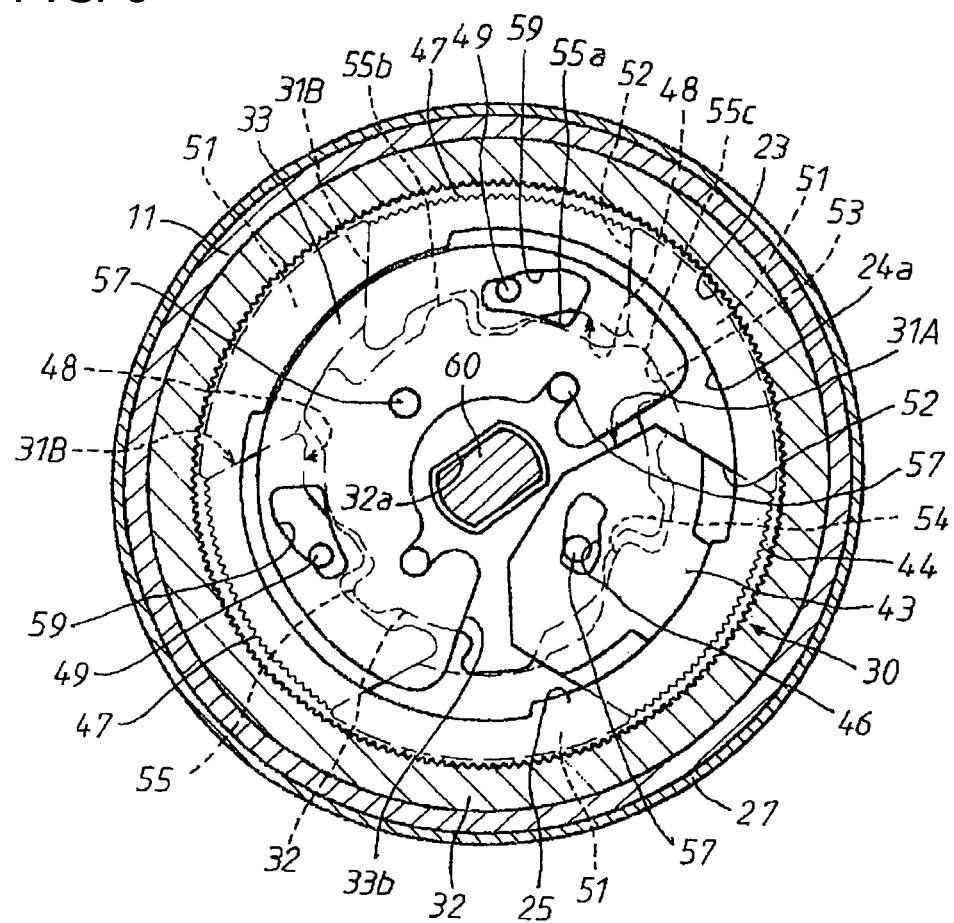
FIG. 9 is an operational state view of FIG. 2 showing the seat reclining device in a free state.

Furthermore, when in the state of the locking released, the seatback is rotated forward relative to the seat cushion beyond a predetermined angle into a so-called forward folded angular range, the protrusion 25 formed on the internal surface of the round recessed portion 24 of the upper arm 12 is positioned between the engaging portion 43 formed on the first pawl 31A and the inner gear 23, as shown in FIG. 9. That is, by being engaged with the protrusion 25 of the upper arm 12 at its engaging portion 43, the first pawl 31A is prevented from moving radially outward. When the operating handle 62 is released in this state, the cam 32 tends to press the first pawl 31A in the direction to engage with the inner gear 23 by the action of the spiral spring 34, but the meshing does not take place because the movement of the first pawl 31A is obstructed by the engagement between the protrusion 25 of the upper arm 12 and the engaging portion 43 of the first pawl 31A. At the same time, as a result that the radial movement of the first pawl 31A is obstructed, the rotation of the cam 32 is also obstructed, and the release plate 33 does not rotate, so that the release plate grooved cam portions 59 cause the second pawls 31B to be also held at an out-of-meshing position spaced from the inner gear 23. Accordingly, within the forward folded angular range, the seatback can be rotated without being locked.

From the forward folded state or the reclined state, the seatback is returned backward or forward to take a best position for seating by the manipulation of the operating handle 62, and when the operating handle 62 is released at such a position, the first and second pawls 31A, 31B, the cam 32 and the release plate 33 are returned to the state shown in FIG. 2 to be brought again into the locking state.

As described above, according to the present embodiment, the following effects can be attained.

Since the load receiving portions 27e formed by cutting and bending parts of the body portion 27c are arranged at plural places in the circumferential direction, it is not required to newly provide portions supporting a caulking load by enlarging the outer diameters of the lower arm 11 and the holder 27, so that the device can be downsized. That is since by being cut and bent, the load receiving portions 27e do not produce bending curves at free ends thereof, flat portions necessary for the load receiving portions 27e can be obtained without enlarging the outer diameters of the lower arm 11 and the holder 27. Further, although the portions supporting the caulking load are required to be precise in the height direction (in the rotational axis direction), it is unnecessary to provide the load receiving portions over the whole outer circumference of the holder 27, thereby resulting in a reduction in cost.

Further, the load receiving portions 27e supporting the caulking load are provided at the positions corresponding to the fixed portions 27d, and thus, when the fixed portions 27d are caulked by the caulking work, the holder 27 can be held reliably and stably, so that the fixing by caulking can be done reliably. Further, the construction is such that the fixed portions 27d are caulked on the lower arm 11 with the load receiving portions 27e receiving the caulking load, and since no load is exerted on the cover wall 27a of the holder 27 during the caulking work, the cover wall 27a is not deformed, so that the smooth sliding between the end surface 12c at the outer circumferential portion of the upper arm 12 on the opposite side to the lower arm 11 and the cover wall 27a is not impeded.

Furthermore, even if burrs are formed at the corner portion 11f which is defined by the end surface 11d at the outer circumferential portion of the lower arm 11 on the upper arm 12 side and the outer circumferential surface 11c of the lower arm 11, that is, at the corner portion 11f of the part of the lower arm 11 covered by the load receiving portions 27e, such burrs are received in the annular spaces 28. Therefore, it dose not occur that the load receiving portions 27e rise at the time of the fixing by caulking or that the burs bite the load receiving portions 27e, so that the dimensional accuracy of the load receiving portions 27e can be secured to be precise in the height direction (in the rotational axis direction).

In addition, the load receiving portions 27e supporting the caulking load are provided at regular intervals in the circumferential direction of the holder 27, and thus, when the fixed portions 27d are caulked by the caulking work, the holder 27 can be held equally and stably in the circumferential direction, so that the fixing by caulking can be done reliably.

INDUSTRIAL APPLICABILITY

A seat reclining device for vehicle according to the present invention is suitable for use in a vehicle seat which supports a seatback to be angularly adjustable relative to a seat cushion.

The invention claimed is:

1. A seat reclining device for vehicle, comprising:
   a lower arm adapted to be supported on either one of a seat cushion side and a seatback side;
   an upper arm supported by the lower arm to be relatively rotatable and adapted to be supported on the other of the seat cushion side and the seatback side;
   a plurality of pawls supported in the lower arm to be radially movable along guide walls and having outer gears disengageably engaged with an inner gear provided on an internal surface of the upper arm;
   a cam for radially moving the pawls by being rotated;
   an urging member engaged with the lower arm at one end and engaged with the cam at the other end and urging the cam in one direction; and
   a holder having a body portion which comprises a cover wall slidably covering an end surface at an outer circumferential portion of the upper arm on an opposite side to the lower arm and a circumferential wall formed continuously with the cover wall and covering an outer circumferential surface of the lower arm; fixed portions provided at an end of the circumferential wall and fixed by pressing on an end surface at an outer circumferential portion of the lower arm on an opposite side to the upper arm; and a plurality of circumferentially spaced load receiving portions cut and bent from the body portion to contact an end surface at the outer circumferential portion of the lower arm on the upper arm side for supporting a pressing load at the time of a fixing by pressing; the holder being fixed on the outer circumferential portion of the lower arm for permitting relative rotational movement between the lower arm and the upper arm and for preventing one of the lower arm and the upper arm from coming off the other in an axial direction wherein an annular space is formed between a corner portion connecting the circumferential wall with the plurality of circumferentially spaced load receiving portions and a corner portion defined by the end surface at the outer circumferential portion of the lower arm on the upper arm side and the outer circumferential surface of the lower arm, wherein the plurality of circumferentially spaced load receiving portions contact the end surface at the outer circumferential portion of the lower arm on the upper arm side, at other portions than portions defining the annual space, and wherein the plurality of circumferentially spaced load receiving portions are formed by cutting and bending parts of the body portion.

2. The seat reclining device for vehicle in claim 1, wherein the fixed portions are provided at positions which correspond to the load receiving portions in a circumferential direction of the upper arm and the lower arm.

3. The seat reclining device for vehicle in claim 1, wherein the load receiving portions are provided at regular intervals in a circumferential direction of the holder.

4. The seat reclining device for vehicle in claim 2, wherein the load receiving portions are provided at regular intervals in a circumferential direction of the holder.

* * * * *